United States Patent
McGrath et al.

(10) Patent No.: US 9,665,411 B2
(45) Date of Patent: May 30, 2017

(54) COMMUNICATION BETWEEN A SERVER ORCHESTRATION SYSTEM AND A MESSAGING SYSTEM

(75) Inventors: Michael P. McGrath, Schaumburg, IL (US); Matthew Hicks, Westford, MA (US); William Henry, Monument, CO (US)

(73) Assignee: Red Hat, Inc., Raleigh, NC (US)

( * ) Notice: Subject to any disclaimer, the term of this patent is extended or adjusted under 35 U.S.C. 154(b) by 560 days.

(21) Appl. No.: 13/461,715

(22) Filed: May 1, 2012

(65) Prior Publication Data
US 2013/0297685 A1    Nov. 7, 2013

(51) Int. Cl.
G06F 15/16    (2006.01)
G06F 9/54    (2006.01)
H04L 29/08    (2006.01)

(52) U.S. Cl.
CPC ............. *G06F 9/541* (2013.01); *H04L 67/02* (2013.01); *H04L 67/2809* (2013.01); *H04L 67/2814* (2013.01)

(58) Field of Classification Search
None
See application file for complete search history.

(56) References Cited

U.S. PATENT DOCUMENTS

| | | | |
|---|---|---|---|
| 6,009,452 A | 12/1999 | Horvitz | |
| 7,774,761 B2 | 8/2010 | Vohra | |
| 7,853,708 B2 | 12/2010 | Townsley et al. | |
| 8,352,941 B1 | 1/2013 | Protopopov et al. | |
| 8,356,274 B2 | 1/2013 | Kwok et al. | |
| 8,505,006 B1 | 8/2013 | Larkin et al. | |
| 8,635,351 B2 | 1/2014 | Astete et al. | |
| 2002/0087958 A1* | 7/2002 | Krause | G06F 9/44563 7/166 |
| 2002/0091753 A1 | 7/2002 | Reddy et al. | |
| 2002/0161869 A1* | 10/2002 | Griffin et al. | 709/221 |
| 2004/0019642 A1* | 1/2004 | Jinzaki | 709/205 |
| 2005/0122955 A1* | 6/2005 | Lin | H04L 45/04 370/351 |
| 2005/0160428 A1 | 7/2005 | Ayachitula et al. | |
| 2006/0277305 A1 | 12/2006 | Bernardin et al. | |
| 2007/0128899 A1 | 6/2007 | Mayer | |

(Continued)

OTHER PUBLICATIONS

USPTO, Office Action for U.S. Appl. No. 13/461,705 mailed Jan. 30, 2014.

(Continued)

*Primary Examiner* — Mohamed Wasel
*Assistant Examiner* — Tsung Wu
(74) *Attorney, Agent, or Firm* — Lowenstein Sandler LLP (57) ABSTRACT

A mechanism for an interface between a server orchestration system and a messaging system is disclosed. In one embodiment a message being broadcast from a server orchestration system to a plurality of nodes that comprise a node layer of a platform as a service (PaaS) application hosting infrastructure is intercepted and introspected to extract an identifier of the first node of a plurality of nodes. Then, a targeted message compatible with a messaging system is generated, the targeted message including the identifier of the first node. The targeted message is then sent to the messaging system to be routed to the first node.

17 Claims, 9 Drawing Sheets

(56) References Cited

U.S. PATENT DOCUMENTS

| | | | |
|---|---|---|---|
| 2007/0147347 A1* | 6/2007 | Ristock | H04L 67/16 370/352 |
| 2007/0203999 A1 | 8/2007 | Townsley | |
| 2008/0028071 A1* | 1/2008 | Miyajima | H04L 29/12028 709/224 |
| 2008/0036488 A1* | 2/2008 | Kelem | G06F 15/7867 326/10 |
| 2008/0163004 A1 | 7/2008 | Yu | |
| 2008/0313639 A1 | 12/2008 | Kumar et al. | |
| 2008/0320474 A1 | 12/2008 | Jelinek et al. | |
| 2009/0024609 A1* | 1/2009 | Barker et al. | 707/5 |
| 2009/0313374 A1 | 12/2009 | Murphy et al. | |
| 2009/0313620 A1 | 12/2009 | Sedukhin et al. | |
| 2010/0122343 A1 | 5/2010 | Ghosh et al. | |
| 2010/0153951 A1 | 6/2010 | Jones | |
| 2010/0262467 A1 | 10/2010 | Barnhill, Jr. | |
| 2010/0275241 A1 | 10/2010 | Srinivasan | |
| 2011/0055310 A1 | 3/2011 | Shavlik et al. | |
| 2011/0083131 A1 | 4/2011 | Pirzada et al. | |
| 2011/0246617 A1 | 10/2011 | Sheehan et al. | |
| 2011/0252320 A1 | 10/2011 | Arrasvuori et al. | |
| 2011/0265164 A1* | 10/2011 | Lucovsky | G06F 9/45533 726/7 |
| 2011/0276584 A1 | 11/2011 | Cotner et al. | |
| 2011/0277027 A1 | 11/2011 | Hayton et al. | |
| 2011/0302415 A1 | 12/2011 | Ahmad et al. | |
| 2012/0004041 A1 | 1/2012 | Pereira et al. | |
| 2012/0011077 A1 | 1/2012 | Bhagat | |
| 2012/0096165 A1 | 4/2012 | Madduri et al. | |
| 2012/0173581 A1 | 7/2012 | Hartig et al. | |
| 2012/0174099 A1 | 7/2012 | Ashok et al. | |
| 2012/0185913 A1 | 7/2012 | Martinez et al. | |
| 2012/0215919 A1 | 8/2012 | Labat et al. | |
| 2012/0246740 A1 | 9/2012 | Brooker et al. | |
| 2013/0005487 A1 | 1/2013 | Frazzini et al. | |
| 2013/0007239 A1 | 1/2013 | Agarwal et al. | |
| 2013/0019243 A1 | 1/2013 | Schmidt et al. | |
| 2013/0036208 A1 | 2/2013 | Dochez | |
| 2013/0055243 A1 | 2/2013 | Dandekar et al. | |
| 2013/0227560 A1 | 8/2013 | McGrath et al. | |
| 2013/0227561 A1 | 8/2013 | Walsh et al. | |
| 2013/0227563 A1 | 8/2013 | McGrath et al. | |
| 2013/0227635 A1 | 8/2013 | Walsh et al. | |
| 2013/0297672 A1 | 11/2013 | McGrath et al. | |
| 2013/0297673 A1 | 11/2013 | McGrath et al. | |
| 2013/0297795 A1 | 11/2013 | McGrath et al. | |
| 2013/0298183 A1 | 11/2013 | McGrath et al. | |
| 2013/0305243 A1 | 11/2013 | Hiki | |
| 2014/0040883 A1 | 2/2014 | Tompkins | |

OTHER PUBLICATIONS

USPTO, Final Office Action for U.S. Appl. No. 13/461,705 mailed Aug. 7, 2014.
USPTO, Office Action for U.S. Appl. No. 13/408,001 mailed Jul. 16, 2014.
USPTO, Office Action for U.S. Appl. No. 13/408,754 mailed Jan. 16, 2014.
USTPO, Final Office Action for U.S. Appl. No. 13/408,754 mailed Jun. 4, 2014.
USPTO, Advisory Action for U.S. Appl. No. 13/408,754 mailed Aug. 11, 2014.
USPTO, Notice of Allowance for U.S. Appl. No. 13/461,584 mailed Jan. 29, 2014.
USPTO, Notice of Allowance for U.S. Appl. No. 13/461,584 mailed May 22, 2014.
USPTO, Office Action for U.S. Appl. No. 13/408,729 mailed Mar. 12, 2014.
USPTO, Notice of Allowance for U.S. Appl. No. 13/408,729 mailed Sep. 29, 2014.
USPTO, Office Action for U.S. Appl. No. 13/408,676 mailed Feb. 27, 2014.
USPTO, Notice of Allowance for U.S. Appl. No. 13/408,676 mailed Oct. 7, 2014.
The Authoritative Dictionary of IEEE Standards Terms. 2000, Standards Information Network IEEE Press. seventh edition. p. 131 and 530.
Corcoran et al. Cross-Tier, Label-based Secuirty Enforcement for Web Applications. 2009. ACM. pp. 269-281.
Linux man page pam_namespace; htt://web.archive.org/web/20081014010639/http://linux.die.net/man/8/pam_nampespace; Oct. 14, 2008.
Loscocco et al. Meeting Critical Security Objectives with Security-Enhanced Linux. 2001. NSA. pp. 1-11.
Morris, James. File System Labeling in SELinux. 2004. RedHat. pp. 1-8.
Red Hat Inc., Red Hat Enterpise Linux 5 Deployment guide, "Deployment, configuration and administration of Red Hat Enterprise Linux 5", Chapter 46—Security and SELinux, pp. 823-848, 26 pages, Jul. 21, 2011.
Smalley, Stephen D. SELinux. 2001.NSA. pp. 1-23.
Unix man unshare clone Janak Desai, Jan. 11, 2006; p. 1-5.
Wiki LXC; http://web.archive.org/web/20120130164103/http://en.wikipedia.org/wiki/LXC; Jan. 30, 2012.
Maoke Chen and Akihiro Nakao, "Feather-Weight Network Namespace Isolation Baased on User-Specific Addressing and Routing in Commodity OS," T. Magedanz et al. (EDS.): TridentCom 2010, LNICST 46, pp. 53-68, 2011.
An Quin et al., "Xconveryer: Guarantee Hadoop Throughput via Lightweight OS-level Virtualization," 2009 Eighth International Conference on Grid and Cooperative Computing, IEEE 2009, pp. 299-304.
Anup K. Ghosh and Angelos Stavrou, "Darpa Mobivisor: an Architecture for High Assurance for Untrusted Applications on Wireless Handheld Devices Via Lightweight Virtualization," Nov. 2010, 28 pages.
Authors et al., "Apparatus and Method of Tenant Context Generation and Propagation in SaaS Environment," Aug. 19, 2010, IP.com. pp. 1-4.
USPTO, Notice of Allowance for U.S. Appl. No. 13/461,705 mailed Nov. 7, 2014.
USPTO, Notice of Allowance for U.S. Appl. No. 13/408,001 mailed Feb. 18, 2015.
USPTO, Notice of Allowance for U.S. Appl. No. 13/408,729 mailed Jan. 22, 2015.
USPTO, Notice of Allowance for U.S. Appl. No. 13/408,676 mailed Jan. 23, 2015.
USPTO, Notice of Allowance for U.S. Appl. No. 13/461,705 mailed Sep. 22, 2015.
USPTO, Office Action for U.S. Appl. No. 13/408,754 mailed Jul. 13, 2015.
USPTO, Final Office Action for U.S. Appl. No. 13/408,754 mailed Nov. 18, 2015.
USPTO, Office Action for U.S. Appl. No. 14/474,694 mailed Aug. 26, 2015.
wikipedia http://web.archive.org/web/20111228040353/http://en.wikipedia.org/wiki/Special_folder; special folder; Dec. 28, 2011.
USPTO, Office Action for U.S. Appl. No. 13/408,754 mailed May 11, 2016.
USPTO, Notice of Allowance for U.S. Appl. No. 14/474,694, mailed Jan. 4, 2016.

* cited by examiner

Fig. 7

COMMUNICATION BETWEEN A SERVER ORCHESTRATION SYSTEM AND A MESSAGING SYSTEM

TECHNICAL FIELD

The embodiments of the invention relate generally to cloud-based application hosting and, more specifically, relate to a messaging in a Platform-as-a-Service Offering.

BACKGROUND

Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose. The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For programs that are web applications, the additional software can include such software components as middleware and a framework. Web applications are programs that receive and act on requests in web or other Internet protocols, such as HTTP. It is common for a user to interact with a web application via a browser executing on the user's client computer system to send requests in a web protocol via the Internet to a server computer system on which the web application is executing. It is also common for automatic user agents to interact with web applications in web protocols in the same fashion.

While many web applications are suitable for execution in the cloud, it often requires significant expertise and effort in order to install, execute, and manage a web application in the cloud. For example, an administrator typically should identify all of the software components for the execution of a web application, and what versions of those software components are acceptable. In addition, the administrator typically should obtain, install, and appropriately configure each such software component, as well as the application itself. Where this high level of expertise and effort has been invested in order to get a web application running on a particular hypervisor and in a particular provider's cloud, a similarly high level of expertise and effort usually should be subsequently invested in order to execute the web application instead or in addition on a different hypervisor and/or in a different particular provider's cloud. Also, it can be difficult or impossible to obtain useful information about how the application is performing and otherwise behaving when executing in the cloud.

Accordingly, software and/or hardware facilities for facilitating the execution of web applications in the cloud have been introduced, and are known as Platform-as-a-Service (PaaS) offerings and systems. PaaS offerings facilitate deployment of applications without the cost and complexity of buying and managing the underlying hardware and software and provisioning hosting capabilities, providing all of the facilities for supporting the complete life cycle of building and delivering web application and services entirely available from the Internet. Typically, these facilities operate as one or more virtual machines (VMs) running on top of a hypervisor in a host server.

In present PaaS offerings, a first customer's deployed applications do not co-exist with any other customer's deployed applications on the VMs that are hosting the first customer's deployed applications. However, such an arrangement can be inefficient to the PaaS provider offering the platform services. This is because a customer often deploys a single application, and the size of the VM does not correspond to the size of the application. It can be costly to initialize a new VM for each customer's application deployment, and it can also be a waste of resources that are not being utilized. In a public cloud environment, a PaaS provider pays for deploying a VM whether the VM lies idle or not. In a private cloud environment, there is still a strain on resources for running VMs that are not completely utilized. As such, it may be more cost-efficient to deploy applications of multiple customers in a single VM, rather than associating a VM or a group of VMs with a single application or a group of applications from a single customer. However, a variety of implementation concerns arise when considering deploying applications of multiple customers in a single VM, such as security concerns and efficient resource sharing concerns.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide enhancing the efficiency and functionality of a server orchestration system by combining it with a messaging system. A method of the invention includes intercepting a message being broadcast from a server orchestration system to a plurality of nodes, the message being intended for a first node of the plurality of nodes and introspecting, by a computer, the intercepted message to extract an identifier of the first node. Then a targeted message can be generated that is compatible with a messaging system and this targeted message can be sent to the first node using the messaging system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "executing," "applying," "discovering," "identifying," "configuring," "establishing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Figure 1:
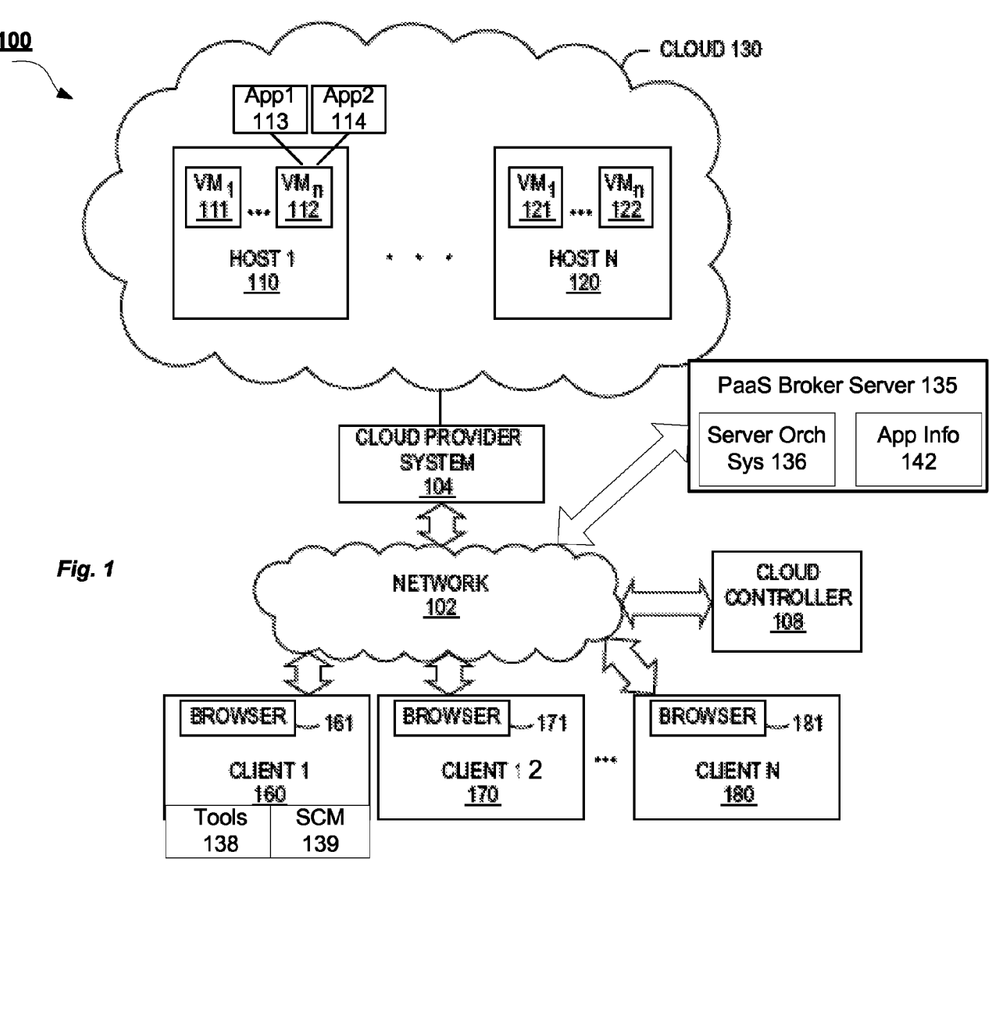
FIG. 1 is a block diagram of a network architecture in which embodiments of the invention may operate.

FIG. 1 is a block diagram of a network architecture 100 in which embodiments of the invention may operate. The network architecture 100 includes a cloud 130 managed by a cloud provider system 104. The cloud 130 provides virtual machines, such as virtual machines 111, 112, 121, and 122. Each virtual machine is hosted on a physical machine configured as part of the cloud 130. Such physical machines are often located in a data center. For example, virtual machines 111 and 112 are hosted on physical machine 110 in cloud 130 provided by cloud provider 104. Users can interact with applications executing on cloud-based virtual machines using client computer systems, such as clients 160, 170 and 180, via corresponding web browser programs 161, 171 and 181.

Clients 160, 170 and 190 are connected to hosts 110, 120 and the cloud provider system 104 via a network 102, which may be may be a private network (e.g., a local area network (LAN), a wide area network (WAN), intranet, or other similar private networks) or a public network (e.g., the Internet). Each client 160, 170, 190 may be a mobile device, a PDA, a laptop, a desktop computer, or any other computing device. Each host 110, 120 may be a server computer system, a desktop computer or any other computing device. The cloud provider system 104 may include one or more machines such as server computers, desktop computers, etc.

In one embodiment, the cloud provider system 104 is coupled to a cloud controller 108 via the network 102. The cloud controller 108 may reside on one or more machines (e.g., server computers, desktop computers, etc.) and may manage the execution of the Web applications in the cloud 130. In one embodiment, the cloud controller 108 receives commands from PaaS broker server 135. Based on these commands, the cloud controller 108 provides data associated with different applications to the cloud provider system 104. PaaS broker server 135 is physical server or a virtual machine and can be hosted by a the same IaaS infrastructure as the hosts 110-120, such as Amazon Cloud Services.

Some of the clients 160-180 access the Web applications hosted on the VMs 111-122 as users. For example, a Web application can be an online social network or blog, and a client can log into the social network or blog to update content and generally use the functionality of the Web application. In one embodiment, each VM 111-122 is a multi-tenant node, meaning each VM can host multiple Web applications owned or managed by different clients. For example, VM 112 is shown hosting two applications of different users or customers, namely, App1 113 and App2 114. A client machine, such as client 1 160 can also be used to create and manage Web applications, such as for example App1 113 hosted by VM 112. As is explained in more detail below, in one embodiment, client 1 160 may be a machine used by a customer of a PaaS system to create or upload a Web application to be hosted by the PaaS system.

The client 160 can include tools 138. Alternatively, tools 138 can be provided by the PaaS broker server 135, and a user of the client 150 can access tools 138 via the browser 161, a command line, or other interface. The tools 138 can be used to issue commands that result in the PaaS broker server 135 creating and managing a Web application on one of the VMs, such as VM1 112, shown as hosting two applications (App1, App2). In one embodiment, the client 160 can also include a source code management (SCM) 139 system, such as Git, to manage version control and to send code to a remote repository on the host nodes 110-120.

In one embodiment, to identify VM1 as the node to create the Web application on, the PaaS broker server 135 can communicate with and collect information from the VMs using a server orchestration system 136. In one embodiment, the PaaS broker server 135 maintains application information 142 about each Web application being hosted on the VMs to track which VM each application is hosted on. Since each VM hosts multiple applications belonging to different application owners in a multi-tenant node environment, applications have specific identifiers as the identifier of the node can correspond to multiple applications. Unique identification of applications, along with sandboxing techniques including security, segregation, and isolation can be used to keep each application from accessing or interfering with another application that may be managed by a different owner. For example, on Linux-based nodes, SELinux™ security labeling can be used to secure access to the applications and Linux control groups can be used to segregate application into different processing spaces, and kernel namespacing can be further used to segregate applications. Tools such as Diskquota™ can then be used to allocate separate resources to the isolated applications. Nodes running other operating system environments can use other such sandboxing techniques to segregate and isolate applications from one another and from the node operating system.

While various embodiments are described in terms of the environment described above, those skilled in the art will appreciate that the facility may be implemented in a variety of other environments including a single, monolithic computer system, as well as various other combinations of computer systems or similar devices connected in various ways.

Figure 2A:
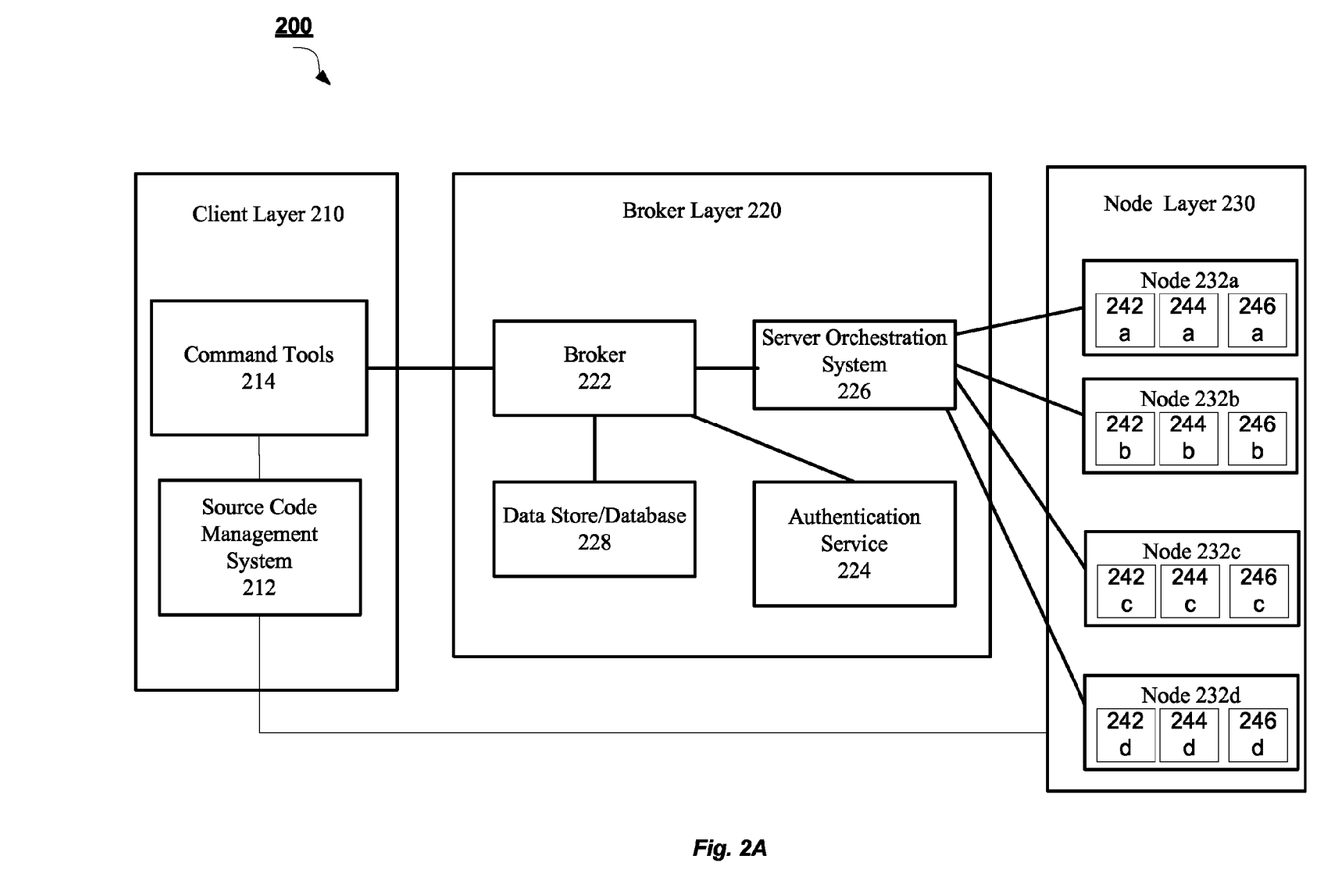
FIG. 2A is a block diagram of a PaaS system architecture according to an embodiment of the invention.

FIG. 2A is a block diagram of a PaaS system architecture 200. The PaaS architecture 200 allows users to launch software applications in a cloud computing environment, such as the could computing environment provided in network architecture 100 described with respect to FIG. 1. The PaaS architecture 200, in one embodiment, includes a client layer 210. In one embodiment, the client layer 210 resides on a client machine, such as a workstation of the software developer. In another embodiment, the client layer 210 resides on a server and is accessible to the client machine via the browser. The client layer 210 includes a source code management system 212, sometimes referred to as "SCM" or revision control system.

One example of such an SCM or revision control system is Git, available as open source software. Git, and other such distributed SCM systems, usually include a working directory for making changes, and a local software repository for storing the changes. The packaged software application can then be "pushed" from the local Git repository to a remote Git repository. From the remote repository, the code may be edited by others with access, or the application may be executed by a machine. Other SCM systems work in a similar manner.

The client layer 210, in one embodiment, also includes a set of command tools 214 that a user can use to create, launch, and manage applications. In one embodiment, the command tools 214 can be downloaded and installed on the user's client machine, and can be accessed via a command line interface or a graphical user interface, or some other type of interface. In one embodiment, the command tools 214 expose the application programming interface ("API") of the broker layer 220 and perform other application management tasks in automated fashion using other interfaces, as will be described further below in accordance with some embodiments.

In one embodiment, the broker layer 220 acts as middleware between the client layer 210 and the node layer 230. The node layer 230 includes the nodes 232 on which software applications are provisioned and executed. In a multi-tenancy cloud hosting environment, each of at least some of the nodes 232 hosts multiple applications 242-246 or application components of different application owners (e.g., different customers of the PaaS system). For example, on node 232a, application 242a and 246a may have different owners.

As used herein, an "application owner," or simply "owner," is the person, persons, or entity that creates, operates, and/or manages an application. The application owner uses the client layer 210 to interact with each application owned by the owner on the node layer 230. The owner is thus the customer of the PaaS system 200. In contrast, a user of the application refers to the end user of the application, i.e., the customer of the application. As an example, a social network company can be the application owner, and a social network member using the social network application can be the user of the social network application.

Using multi-tenancy to host multiple applications belonging to multiple application owners saves resources, as multiple applications can utilize the operating system, middleware, communications resources, and other shared resources of the node 230. However, hosting multiple applications belonging to different application owners and operators on a single node results in various complications that are addressed by the embodiments set forth herein.

In one embodiment, each node 232 is a virtual machine (VM) provisioned by an Infrastructure as a Service (IaaS) provider, such as Amazon Web Services™. In other embodiments, the nodes 232 can be physical machines or virtual machines residing on a single physical machine. In one embodiment, the broker layer 220 is implemented on one or more machines, such as server computer, desktop computer, etc. In some embodiments, the broker layer 220 may be implemented on one or more machines separate from machines implementing each of the client layer 210 and the node layer 230.

In one embodiment, the broker layer 220 includes a broker that coordinates some of the requests from the client layer 210 with actions performed at the node layer 230. One such request is new application creation. In one embodiment, when a user, using the command tools 214 requests the creation of a new application, or some other action to manage the application, the broker 222 first authenticates the user using an authentication service 224 such as Streamline™ or some other authentication tool. Once the user has been authenticated and allowed access to the system, the broker 222 uses a server orchestration system 226 to collect information and configuration information about the nodes 232.

In one embodiment, the broker 222 uses the Marionette Collective™ ("MCollective™") framework available from Puppet Labs™ to facilitate parallel job execution of the server orchestration system 226. The server orchestration system, in one embodiment, functions to coordinate server-client interaction between multiple—sometimes a large number of—servers. The servers being orchestrated in one embodiment are the nodes 232, which are acting as application servers and web servers.

For example, if the broker 222 wanted to shut down all applications on all even numbered nodes out of 100,000 nodes, the broker 222 would only need to provide one command to the server orchestration system 226. The server orchestration system 226 would—in one embodiment—generate a separate message to all nodes to shut down applications if the node is even, and distribute the messages to the nodes using a messaging and queuing system. Thus, in one embodiment, the broker 222 manages the business logic and model representing the nodes 232 and the applications residing on the nodes, and acts as the controller that generates the actions requested by users via the client tools 214 API. The server orchestration system 226 then takes those actions generated by the broker 222 and orchestrates their execution on the many nodes 232 managed by the system.

In one embodiment, the information collected about the nodes 232 can be stored in a data store 228. In one embodiment, the data store 228 can be a locally hosted database or file store, or it can be a cloud based storage service provided by a SaaS storage provider, such as Amazon™ S3™ (Simple Storage Service™). The broker 22 then uses the information about the nodes 232 and their applications to model the application hosting service and to maintain records about the nodes. In one embodiment, node data is stored in the form of a JavaScript Object Notation (JSON) blob or string that maintains key-value pairs to associate a unique identifier, a hostname, a list of applications, and other such attributes with the node.

Figure 2B:
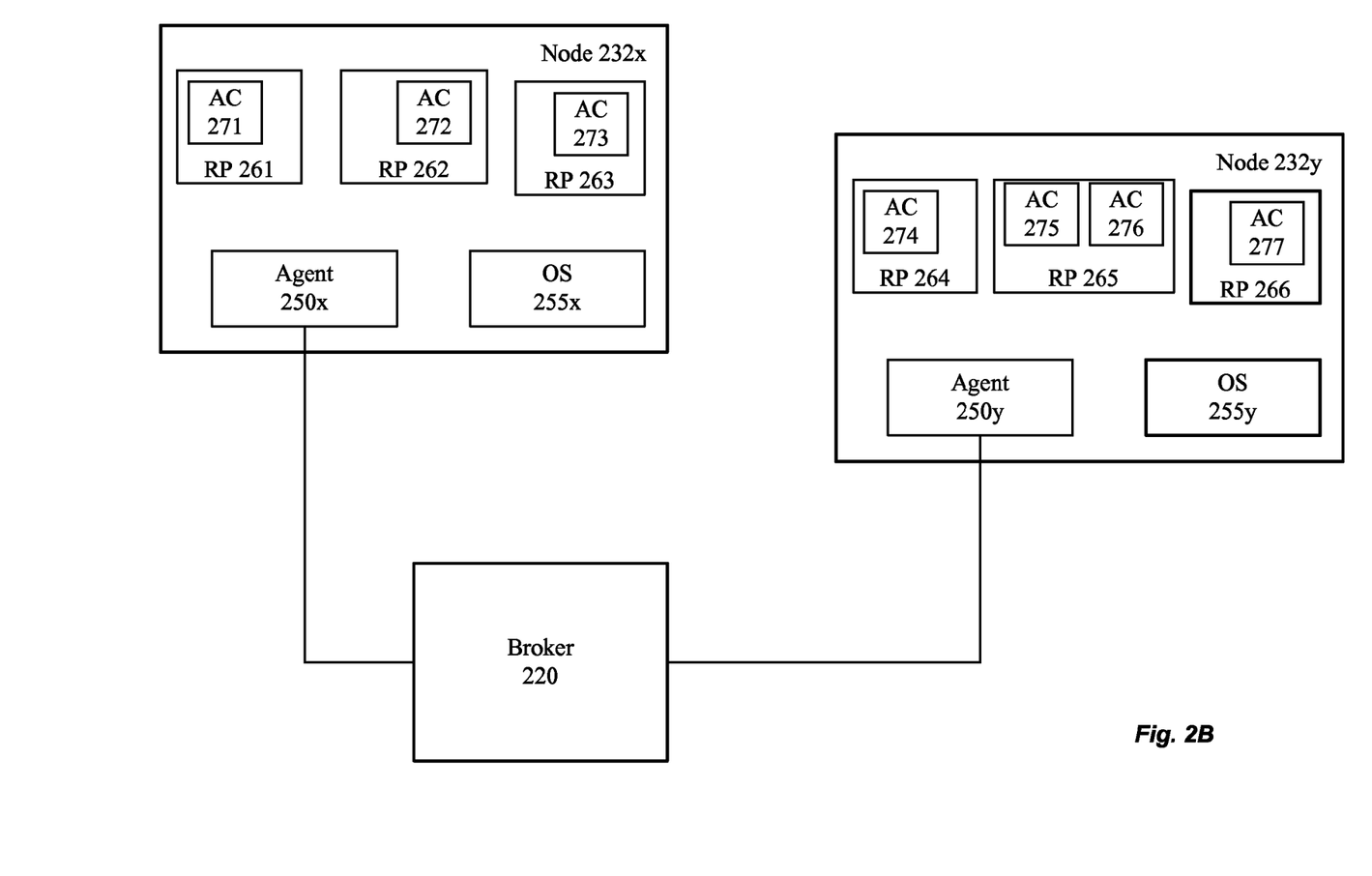
FIG. 2B is a block diagram a node layer of a PaaS system according to an embodiment of the invention.

Another embodiment of node architecture for nodes 232 is now described with reference to FIG. 2B. In one embodiment, nodes 232—which may be virtual machines of a cloud-based IaaS environment—can be further subdivided into resource pools. For example, node 232x is shown to have three resource pools 261-263. Other embodiments can have any other number of resource pools per node, and the number of resource pools can vary between different nodes and implementations.

Each node 232 is allocated a certain amount of hardware and middleware resources, such as memory, processing cycles, communications, messaging, and other such provisions to implement a virtual machine. Each node 232 also has a node operating system 255 to manage and use those allocated resources. In one embodiment, a resource pool is a further division of those allocated resources into distinct and separate groups. As used herein, a resource pool refers to a collection of VM/node resources—such as processing cycles, memory, and middleware—that are districted away from other VM resources. In some embodiments, a resource pool includes a software cartridge that acts as middleware for an application component (for example, JBoss for an application server component of a composite application). The resource pools can be managed by the node operating system 255.

In one embodiment, the resource pools are segregated from each other, so that each resource pool accesses common node resources as if it were the only resource pool on the node. This allows multiple resource pools to share some node resources (such as an HTTP server and the underlying node operating system). In one embodiment using a Linux-based node, resource pools are segregated from each other using SELinux™ security labeling, Linux control groups, and kernel namespacing, as described above. Nodes running other operating system environments can use other such sandboxing techniques to segregate and isolate resource pools from one another and from the node operating system. Communications between the broker 222 and the nodes 232 can be coordinated by an agent 250 of a server orchestration system or other messaging platform, as described further below.

In one embodiment, applications are not only associated with a node 232 and a software repository on the node, but with a resource pool. In one embodiment, one resource pool contains only one application, or multiple applications owned by the same client. In such an embodiment, the resource pools are used as the security and segregation container to implement multi-tenancy.

In yet other embodiments, the applications hosted by the PaaS system include composite n-tier Web applications that have several separate components, such as a Web server, an application server, and a database, all implemented separately. In such an embodiment, each application component can be provided a different resource pool, although several application components owned by the same application owner can reside in the same resource pool.

For example, node 232y is shown as having three resource pools 264-266. Each resource pool is hosting an application component 274-277. Resource pools 264 and 266 host one application component each, applications components 274 and 277 respectively. Resource pool 265 is hosting two separate application components 265, 276. In one embodiment, the two separate application components 265, 276 being hosted by resource pool 265 are components of the same composite application, but in other embodiments, they may be components of different applications owned by the same application owner (PaaS customer), or two different applications owned by the same application owner.

In one embodiment, different components of one composite application can be hosted by different resource pools. For example, application component 271 and application component 272—hosted by resource pool 261 and resource pool 262 respectively—can be two components of the same composite application. In one embodiment, different components of one composite application can further be hosted by different resource pools residing on different nodes 232. For example, application component 271 and application component 277—hosted by resource pool 261 of node 232x and resource pool 266 of node 232y respectively—can be two components of the same composite application.

While much of the discussion herein is set forth in terms of applications—as a whole—for simplicity, many facets, techniques, implementations, and embodiments can be applied to application components without loss of generality. For example, when determining which node of the PaaS system to select to host an application as described further below, the same or similar methodologies and systems can be used to determine which node of the PaaS system to select to host an application component. By way of another example, communications and interfaces between the client layer and applications described further below, are equally applicable to application components instead of applications. Thus, as used herein throughout, the terms "application" and "application component" can be used interchangeably where appropriate.

Once an application has been created on a node it can be managed and controlled using the client layer 210 described with reference to FIG. 2A. The client layer 210 provides command tools 214 to enable the creator or owner of an application to interact with and manage the applications. For example, the command tools 214 can allow the application owner to stop and start applications, to download and inspect applications logs, to archive the application, to reconfigure the application, to provision additional resources to the application, to receive application performance metrics, and other such application management tasks.

Figure 3:
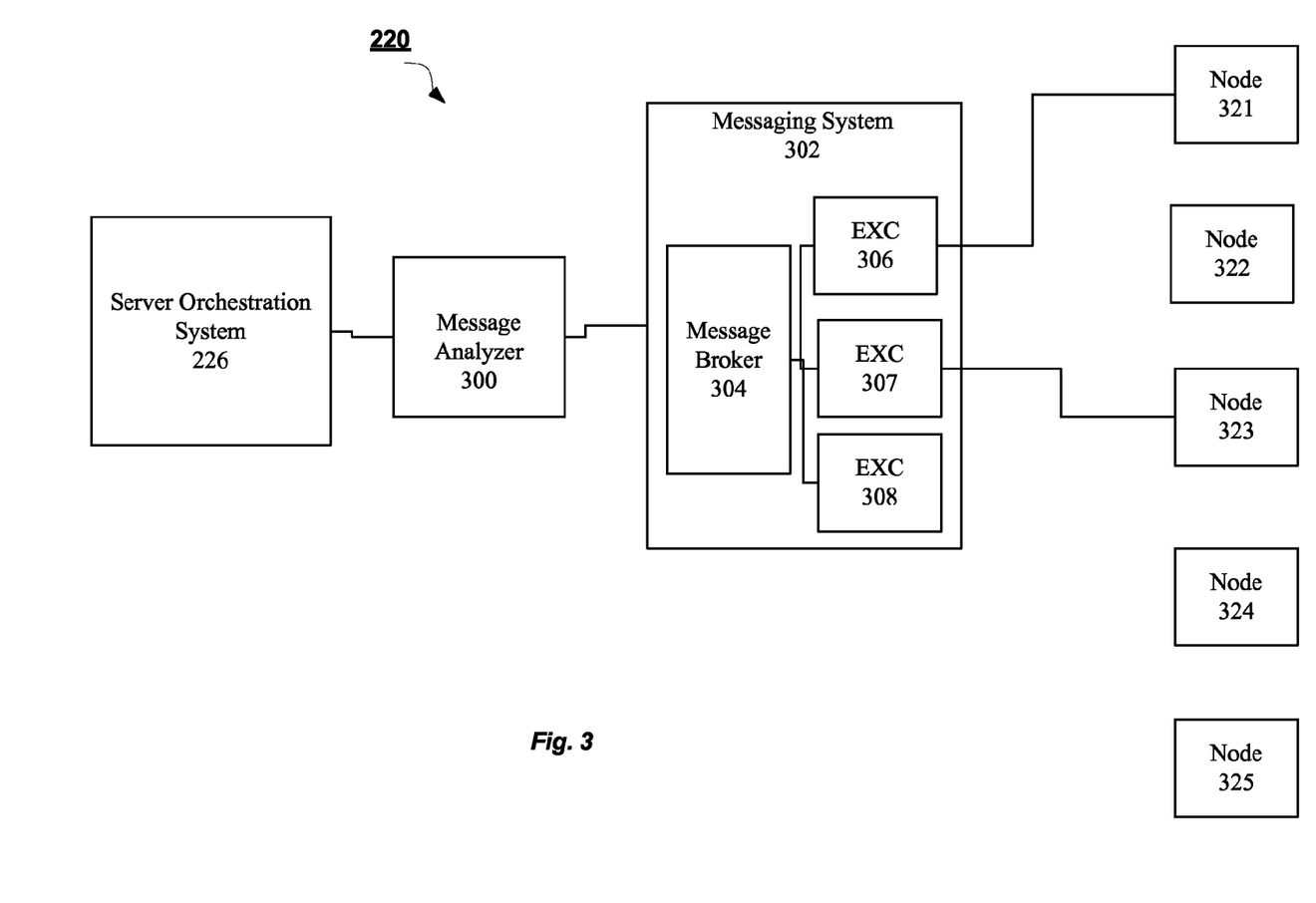
FIG. 3 is a block diagram of a communication infrastructure between a server orchestration system and a node layer via a messaging system according to an embodiment of the invention.

One embodiment of enhancing a server orchestration system by coordinating collaboration between the server orchestration system and a messaging system is now described with reference to FIG. 3. The broker layer 220 includes the server orchestration system 226, as described above. Server orchestration systems, such as MCollective, communicate with server nodes using a broadcast message mechanism. When the server orchestration system needs to find a node with PHP installed, for example, it sends a broadcast to all nodes asking for this information. When the server orchestration system selects one of the nodes with PHP (for example to host a new PHP application), the server orchestration system communicates with the selected node using the same broadcast message mechanism. Nodes other than the selected node ignore these messages. However, such broadcast messages to untargeted nodes create inefficiency and waste communications and network resources.

Thus, in one embodiment, a messaging system 302 is used to enhance the functionality of the server orchestration system 226. The messaging system 302 includes a message broker 304 that routes messages to one or more of a set of exchanges 306-308. Each exchange manages one or more message queues (not shown) that queue messages to specific nodes or sets of nodes. In one embodiment, the messaging system implements the advanced message queuing protocol (AMQP) messaging standard for message-oriented middleware, such as Qpid™, which is available as open source software from the Apache™ Foundation.

In one embodiment, a message analyzer 300 is disposed between the server orchestration system 226 and the messaging system 302 to intercept the broadcast-type messages from the server orchestration system and convert them into targeted messages compliant with the AMQP standard, or some other format used by the messaging system 302. In one embodiment, the message analyzer 300 introspects intercepted messages to alter them in a way that allows the message broker 304 to route them to the appropriate exchange 306-308.

Using the exchanges 306-308, more complicated messaging patterns can be implemented besides simple broadcast message mode. The AMQP standard defines several messaging patterns that can be implemented using the exchanges 306-308. For example, exchange 306 can implement a direct targeted message where messages from exchange 306 are routed to node 321 only. Similarly, exchange 307 can be configured to queue messages bound for node 323. Exchange 308 can implement a broadcast pattern delivering messages to all node layer nodes 321-325.

Figure 4:
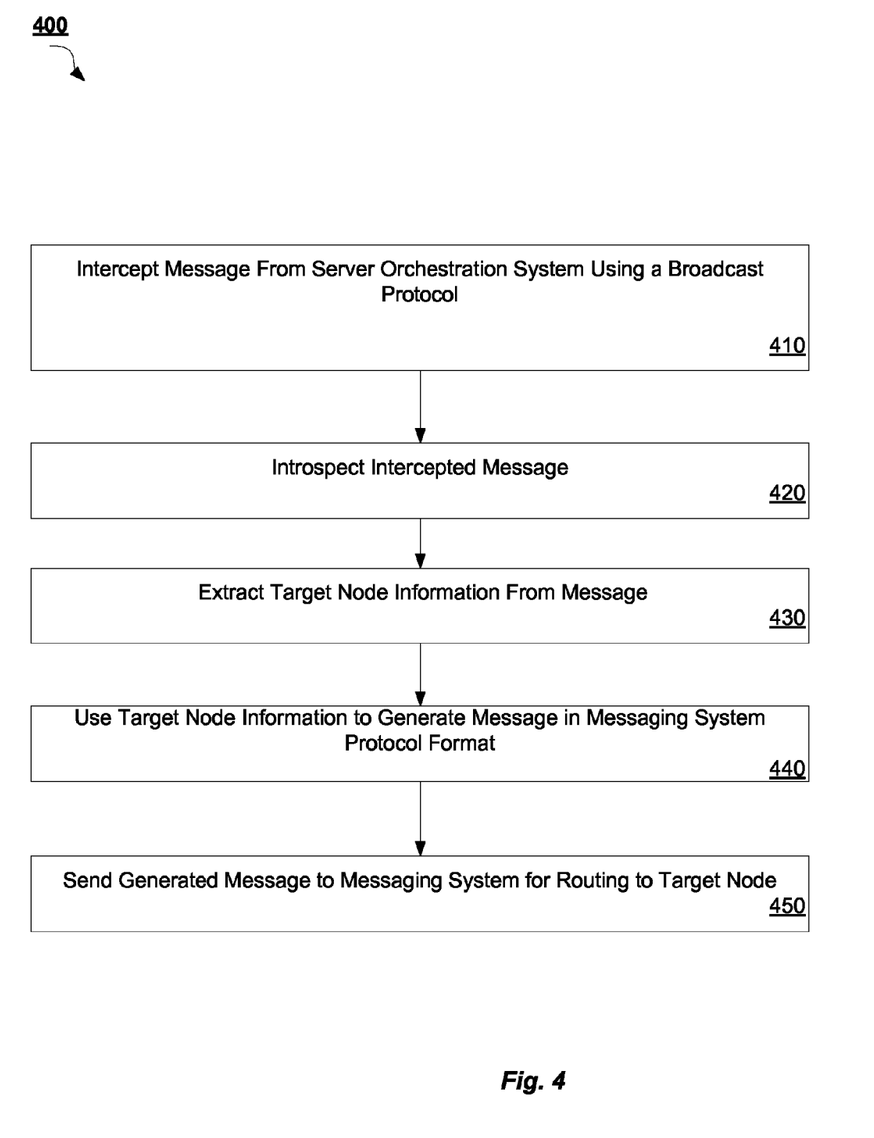
FIG. 4 is a flow diagram illustrating a method message routing according to an embodiment of the invention.

One embodiment of the operation of the message analyzer 400 is now described with reference to FIG. 4. The method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the message analyzer 300 of FIG. 3.

Processing begins at block 410 with the interception of a message from the server orchestration system over a broadcast protocol used by the server orchestration system. In one embodiment, the intercepted message is targeted a specific node or a specific group of nodes. At block 420, the intercepted message is introspected to analyze the information and data contained in the message.

At block 430, information about the target node (herein referred to as "target node information") is extracted from the intercepted message. The target node information may be a hostname, UUID, or other identifier of the target node or set of nodes for whom the intercepted message is intended. The target node information can be located within the message by reading specific fields known to contain such information according to the server orchestration system's broadcast protocol, or by pattern matching to node hostnames, or other such technique.

At block 440, the extracted target node information, along with the other contents of the intercepted message, are used to generate a new message that includes the content of the intercepted message, and includes a field containing the target node information that is in a format used to route messages by the protocol implemented by the messaging system. Then, in block 450, the new message is forwarded to the messaging system to be delivered in a targeted fashion to the indented recipient node. In this fashion, instead of the intercepted message being sent to every node, the corresponding message is sent only once to the intended recipient.

Using a message analyzer to enhance the functionality of the server orchestration system by combining it with a messaging system can also be used to implement messaging pattern and functionality not available to the server orchestration system. One such embodiment is described with reference to FIGS. 5 and 6.

Figure 5A:
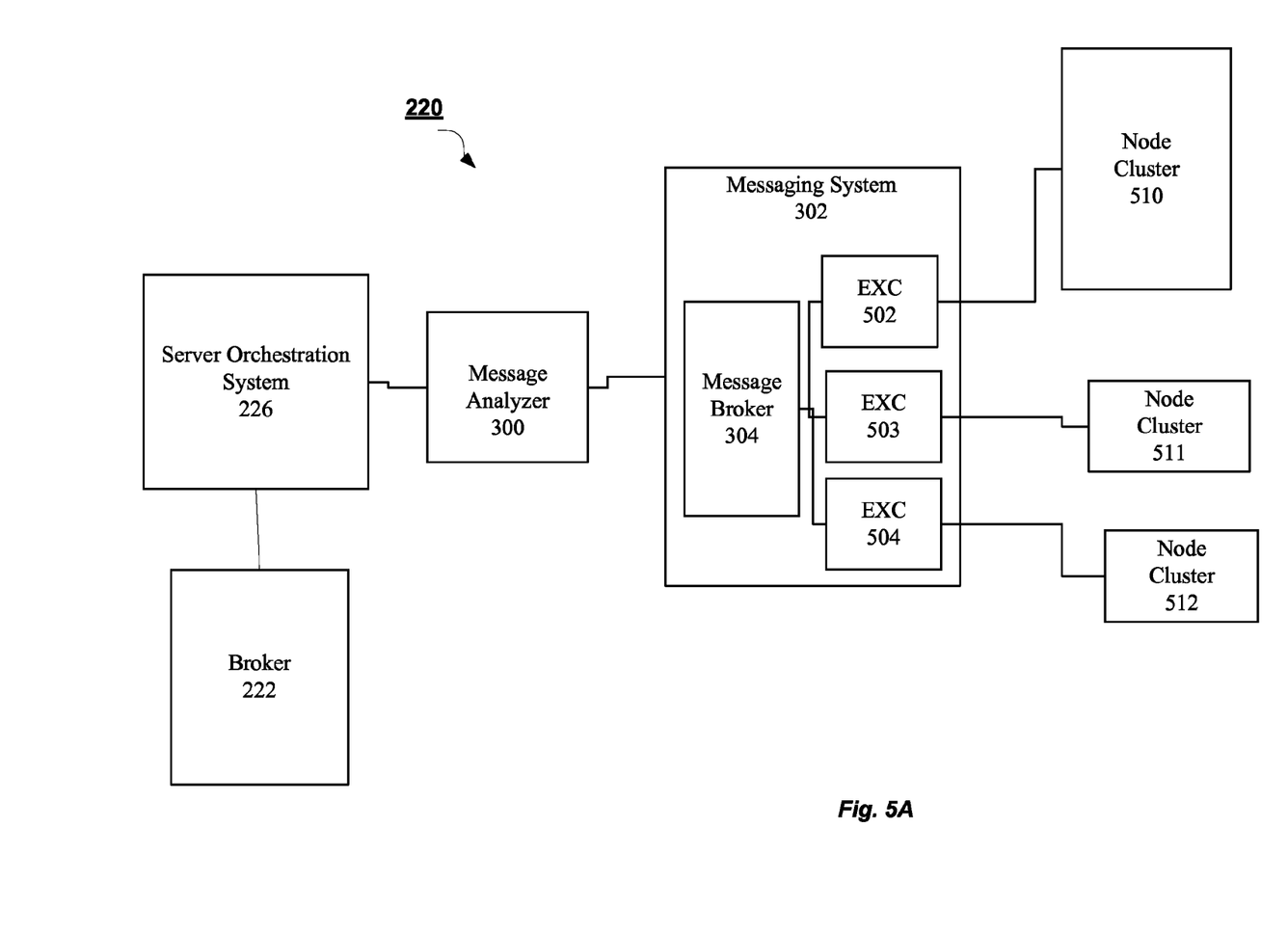
FIG. 5A is a block diagram of a communication infrastructure between a server orchestration system and a plurality of node clusters via a messaging system according to an embodiment of the invention.

FIG. 5A illustrates the server communications system 226 utilized by the broker 222 to send messages to a node layer. The node layer is divided into node clusters 510-512. Each cluster can be separated by purpose, or some other arbitrary delineation. Each node cluster can be given a unique name or UUID within the PaaS system. Without the use of a messaging system 302, the server orchestration system 226 would broadcast messages to all clusters. In this manner, a single broker (such as broker 222) can manage multiple local node clusters, that may be delineated by purpose for example. Instead of exchanges 502-504 being configured to route messages to specific nodes, they can be configured to route messages to specific node clusters addressable by the broker 222.

In one embodiment, the message analyzer 300 can intercept messages from the server orchestration system 226 as described above. The message analyzer 300 detects and extract a node cluster identifier from the message and generate a new message in the format recognized by the message broker 304 that includes an identifier of the target node cluster.

In one embodiment, the messaging system 302 is configured so that certain exchanges route messages to certain node clusters. For example, exchange 502 is configured to route messages to node cluster 510, exchange 503 is configured to route messages to node cluster 511 (e.g., a node cluster used to host test applications), and exchange 504 is configured to route messages to node cluster 512. Thus, by rewriting the broadcast style messages of the server orchestration system 226 to a format the can be processed by the messaging system 302 using the message analyzer 300, messages can be routed directly to different node clusters without the need to broadcast to all node clusters.

Figure 5B:
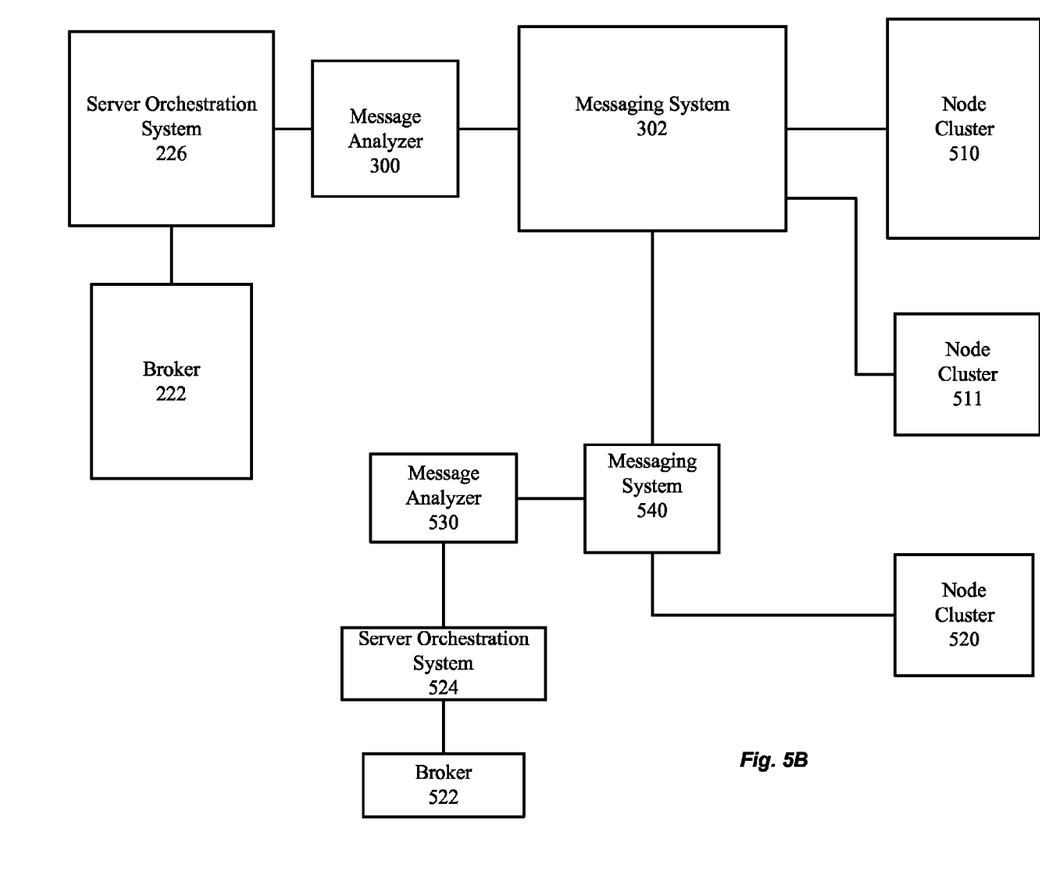
FIG. 5B is a block diagram of a communication infrastructure between a server orchestration system and a local node cluster and a remote node cluster according to an embodiment of the invention.

FIG. 5B illustrates an embodiment of combining a server orchestration system 226 utilized by the broker 222 to send messages to a local and remote node clusters. Messaging system 302 and the server orchestration system 226 are used by the broker 222 to interface with the node layer it manages, node cluster 510 in this example and node 511. The PaaS system may also include other node clusters—such as node cluster 520 and node cluster 512—which—in one embodiment—have their own associated broker 522 and server orchestration system 524, message analyzer 530, and messaging system 540, functioning as a sub-PaaS system. The brokers of the clusters (such as broker 222 and 522) can be federated in a network of brokers enabling the brokers to communicate with each other. Each node cluster can be given a unique name or UUID within the PaaS system that brokers can use to identify node clusters.

In one embodiment, the messaging system 302 can be used to seamlessly route messages from the broker 222 or the server orchestration system 226 to remote node clusters (other node layers). In one embodiment, the message analyzer 300 can intercept messages from the server orchestration system 226 as described above. If the message analyzer 300 determines that the message is bound for a node in a different node cluster than the one managed by the broker 222 (such as remote node cluster 520), the message analyzer can retrieve an identifier of the appropriate node cluster and generate a new message in the format recognized by the message broker 304 that includes the identifier of the remote node cluster 520.

In one embodiment, the messaging system 302 is configured so that certain exchanges route messages to certain node clusters. Thus, messages destined for a remote node cluster can be routed to an exchange associated with the messaging system 540 of the remote node cluster. The remote messaging system 540 then can further route to message to a node in the remote node cluster managed by the remote broker 522. Thus, by rewriting the broadcast style messages of the server orchestration system 226 to a format the can be processed by the local messaging system 302 and the remote messaging system 540 using the message analyzer 300, messages can be routed directly to remote node clusters without the need to broadcast to all remote node clusters.

Figure 6:
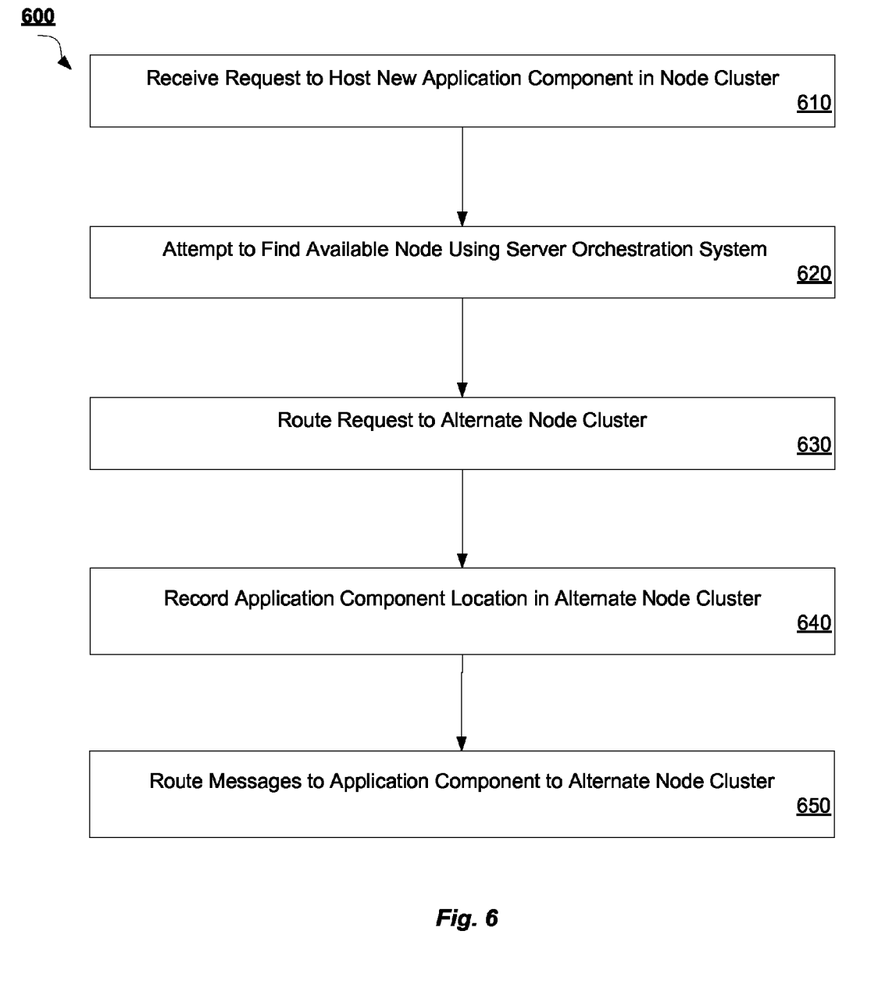
FIG. 6 is a flow diagram illustrating a method for message routing according to another embodiment of the invention.

One embodiment of the operation of the broker 222 is now described with reference to FIG. 6. The method 600 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by the broker 222 of FIG. 5.

Processing begins at block 610 with the receiving of a request to host a new application or application component in the node cluster managed by the broker 222. At block 620, an unsuccessful attempt is made to find a node in the node cluster that can host the requested application. For example, the required capacity or capabilities may not exist or be available in the node cluster.

At block 630, since the request cannot be serviced by the local or preferred node cluster, the request message is routed to an alternate node cluster. In one embodiment, the identifier of a remote node cluster is included in the message by the broker and the server orchestration system. The message analyzer then intercepts this message, and rewrites the message in a format that causes the message broker to route the request message to an exchange associated with the alternate node cluster.

The alternate node cluster can then service the request and transmit back an identity of a node that is hosting the requested application component. At block 640, this location of the application component in the alternate node cluster is recorded. Then, at block 650, future messages from the broker 222 to the application component are routed to the alternate node cluster. In one embodiment, each such message will include the identifier of the alternate node cluster, the identifier of the target node in the remote node cluster, or both. Such messages are then rewritten by the message analyzer to format them to enable the message broker to route them to the exchange associated with the alternate node cluster.

Figure 7:
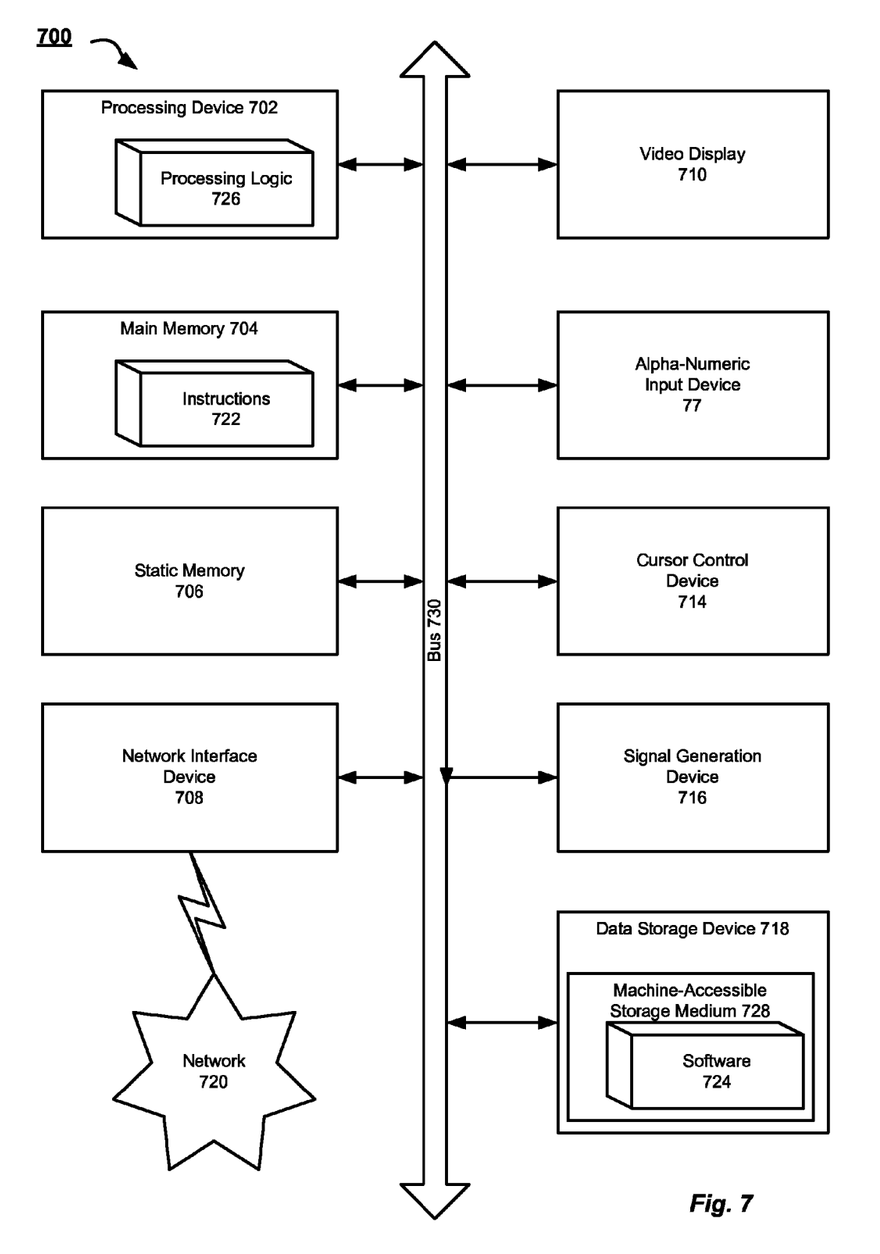
FIG. 7 illustrates a block diagram of one embodiment of a computer system.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 728 on which is stored software 724 embodying any one or more of the methodologies of functions described herein. The software 724 may also reside, completely or at least partially, within the main memory 704 and/or within the processing device 702 during execution thereof by the computer system 700; the main memory 704 and the processing device 702 also constituting machine-accessible storage media.

The machine-readable storage medium 728 may also be used to store instructions to perform message proxying as described with reference to FIG. 11 and/or a software library containing methods that call the above applications. While the machine-accessible storage medium 728 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:
  monitoring, by a processing device, a server orchestration system for transmission of messages from the server orchestration system, wherein the server orchestration system implements a multi-cast broadcast message protocol to send the messages concurrently to a plurality of nodes, the plurality of nodes comprising a first node layer of a first platform as a service (PaaS) application hosting infrastructure that enables each node of the plurality of nodes to host multiple applications belonging to multiple application owners;
  receiving, by the processing device, a request message being broadcast from the server orchestration system to the plurality of nodes, wherein the request message comprises a request to host a new application in the plurality of nodes;
  determining that a first node of the plurality of nodes is not available to host the new application;
  intercepting the request message, by the processing device, in response to the determination that the first node of the plurality of nodes is not available to host the new application, the intercepted request message intended for the first node of the plurality of nodes, wherein intercepting the request message prevents the request message from being transmitted to the plurality of nodes;
  extracting, by the processing device, an identifier of the first node from the intercepted request message;
  converting, by the processing device, the intercepted request message into a targeted message compliant with a targeted messaging protocol of a messaging system, the targeted message comprising the identifier of the first node, wherein the identifier is utilized by the targeting messaging protocol for routing of the targeted message to a remote node cluster, and wherein the identifier of the first node comprises an identifier of the remote node cluster not accessible to the server orchestration system, the remote node cluster comprising a second node layer of a second PaaS application hosting infrastructure that enables each node of the remote node cluster to host multiple applications belonging to multiple application owners; and
  sending the targeted message to the messaging system to be routed to the remote node cluster via the targeted messaging protocol.

2. The method of claim 1, wherein the multi-cast broadcast message protocol comprises a format specific to the server orchestration system.

3. The method of claim 2, wherein the targeted messaging protocol comprises a format specific to the messaging system.

4. The method of claim 3, wherein the format of the server orchestration system complies with advanced message queuing protocol (AMQP).

5. The method of claim 1, further comprising routing, by the messaging system, the targeted message to an exchange associate with the first node.

6. The method of claim 1, wherein the first node comprises a first set of nodes that is a subset of the plurality of nodes.

7. A system, comprising:
  a memory; and
  a processing device communicably coupled to the memory, wherein the processing device is to:
    monitor a server orchestration system for transmission of messages from the server orchestration system, wherein the server orchestration system implements a multi-cast broadcast message protocol to send the messages concurrently to a plurality of nodes, the plurality of nodes comprising a first node layer of a first platform as a service (PaaS) application hosting infrastructure that enables each node of the plurality of nodes to host multiple applications belonging to multiple application owners;
    receive a request message being broadcast from the server orchestration system to the plurality of nodes, wherein the request message comprises a request to host a new application in the plurality of nodes;
    determine that a first node of the plurality of nodes is not available to host the new application;
    intercept the request message, in response to the determination that the first node of the plurality of nodes is not available to host the new application, the intercepted request message intended for the first node of the plurality of nodes, wherein intercepting the request message prevents the request message from being transmitted to the plurality of nodes;
    extract an identifier of the first node from the intercepted request message;
    convert the intercepted request message into a targeted message compliant with a targeted messaging protocol of a messaging system, the targeted message comprising the identifier of the first node, wherein the identifier is utilized by the targeting messaging protocol for routing of the targeted message to a remote node cluster, and wherein the identifier of the first node comprises an identifier of the remote node cluster not accessible to the server orchestration system, the remote node cluster comprising a second node layer of a second PaaS application hosting infrastructure that enables each node of the remote node cluster to host multiple applications belonging to multiple application owners; and send the targeted message to the messaging system to be routed to the remote note cluster via the targeted messaging protocol.

8. The system of claim 7, wherein the multi-cast broadcast message protocol comprises a format specific to the server orchestration system.

9. The system of claim 8, wherein the targeted messaging protocol comprises a format specific to the messaging system.

10. The system of claim 9, wherein the format of the server orchestration system complies with advanced message queuing protocol (AMQP).

11. The system of claim 7, wherein the processing device is further to route the targeted message to an exchange associate with the first node.

12. A non-transitory machine-readable storage medium including instructions that, when accessed by a processing device, cause the processing device to:
monitor, by the processing device, a server orchestration system for transmission of messages from the server orchestration system, wherein the server orchestration system implements a multi-cast broadcast message protocol to send the messages concurrently to a plurality of nodes, the plurality of nodes comprising a first node layer of a first platform as a service (PaaS) application hosting infrastructure that enables each node of the plurality of nodes to host multiple applications belonging to multiple application owners;
receive, by the processing device, a request message being broadcast from the server orchestration system to the plurality of nodes, wherein the request message comprises a request to host a new application in the plurality of nodes;
determine that a first node of the plurality of nodes is not available to host the new application;
intercept the request message, by the processing device, in response to the determination that the first node of the plurality of nodes is not available to host the new application, the intercepted request message intended for the first node of the plurality of nodes, wherein intercepting the request message prevents the request message from being transmitted to the plurality of nodes;
extract, by the processing device, an identifier of the first node from the intercepted request message;
convert, by the processing device, the intercepted request message into a targeted message compliant with a targeted messaging protocol of a messaging system, the targeted message comprising the identifier of the first node, wherein the identifier is utilized by the targeting messaging protocol for routing of the targeted message to a remote node cluster, and wherein the identifier of the first node comprises an identifier of the remote node cluster not accessible to the server orchestration system, the remote node cluster comprising a second node layer of a second PaaS application hosting infrastructure that enables each node of the remote node cluster to host multiple applications belonging to multiple application owners; and
send the targeted message to the messaging system to be routed to the remote node cluster via the targeted messaging protocol.

13. The non-transitory machine-readable storage medium of claim 12, wherein the multi-cast broadcast message protocol comprises a format specific to the server orchestration system.

14. The non-transitory machine-readable storage medium of claim 13, wherein the targeted messaging protocol comprises a format specific to the messaging system.

15. The non-transitory machine-readable storage medium of claim 14, wherein the format of the server orchestration system complies with advanced message queuing protocol (AMQP).

16. The non-transitory machine-readable storage medium of claim 12, wherein the processing device is further to route the targeted message to an exchange associate with the first node.

17. The non-transitory machine-readable storage medium of claim 12, wherein the first node comprises a first set of nodes that is a subset of the plurality of nodes.

* * * * *